(12) United States Patent
Howard et al.

(10) Patent No.: US 9,120,027 B2
(45) Date of Patent: Sep. 1, 2015

(54) TOY CONTROLLER FOR PROVIDING INPUT TO A COMPUTING DEVICE

(71) Applicant: Zyrobotics, LLC., Atlanta, GA (US)

(72) Inventors: Ayanna Howard, Atlanta, GA (US); John Harding, Atlanta, GA (US)

(73) Assignee: Zyrobotics, LLC, Atlanta, GA (US)

( * ) Notice: Subject to any disclaimer, the term of this patent is extended or adjusted under 35 U.S.C. 154(b) by 0 days.

(21) Appl. No.: 14/256,641

(22) Filed: Apr. 18, 2014

(65) Prior Publication Data

US 2015/0217204 A1 Aug. 6, 2015

Related U.S. Application Data

(60) Provisional application No. 61/934,312, filed on Jan. 31, 2014.

(51) Int. Cl.
*G09B 21/00* (2006.01)
*A63H 17/36* (2006.01)

(52) U.S. Cl.
CPC ...................................... *A63H 17/36* (2013.01)

(58) Field of Classification Search
None
See application file for complete search history.

(56) References Cited

U.S. PATENT DOCUMENTS

| | | | | |
|---|---|---|---|---|
| 4,768,230 | A * | 8/1988 | Viebrantz et al. | 398/106 |
| 5,542,102 | A * | 7/1996 | Smith et al. | 455/462 |
| 6,457,206 | B1 * | 10/2002 | Judson | 15/320 |
| 6,747,590 | B1 * | 6/2004 | Weber | 341/176 |
| 6,786,795 | B1 * | 9/2004 | Mullaney et al. | 446/431 |
| 2003/0227406 | A1 * | 12/2003 | Armstrong | 341/176 |
| 2005/0179558 | A1 * | 8/2005 | Williams et al. | 340/825.69 |
| 2007/0035412 | A1 * | 2/2007 | Dvorak et al. | 340/825.69 |
| 2007/0063834 | A1 * | 3/2007 | Bozzone et al. | 340/539.1 |
| 2007/0293124 | A1 * | 12/2007 | Smith et al. | 446/454 |
| 2009/0161026 | A1 * | 6/2009 | Wu et al. | 348/734 |

* cited by examiner

*Primary Examiner* — Ojiako Nwugo
(74) *Attorney, Agent, or Firm* — Foley and Lardner LLP; John D. Lanza (57) ABSTRACT

A toy for providing input to a computing device includes a main body sized and shaped to fit within a grasp of a user of the toy. The toy also includes input switches mounted to the main body. Each of the input switches can switch between a first position and a second position responsive to an action performed on the input switch. The toy also includes a removable outer covering that is configured to substantially encapsulate the main body. A top surface of the covering includes openings sized and shaped to receive a portion of each of the input switches. The toy includes a programmable processing circuit enclosed within the main body. The circuit includes input ports coupled to the input switches. The circuit includes an output port coupled to a communications port to transmit output signals and programmable processing circuitry configured to operate in a plurality of operating modes.

16 Claims, 11 Drawing Sheets

PROVIDE A MAIN BODY SIZED AND SHAPED TO FIT
WITHIN A GRASP OF A USER OF THE APPARATUS
605

MOUNT A PLURALITY OF INPUT SWITCHES TO THE MAIN
BODY
610

SUBSTANTIALLY ENCAPSULATE A REMOVABLE OUTER
COVERING AROUND THE MAIN BODY
615

ENCLOSE A PROGRAMMABLE PROCESSING CIRCUIT
WITHIN THE MAIN BODY
620

TOY CONTROLLER FOR PROVIDING INPUT TO A COMPUTING DEVICE

RELATED APPLICATIONS

This present application is a continuation of U.S. Patent Application No. 61/934,312, entitled, "TOY CONTROLLER FOR PROVIDING INPUT TO A COMPUTING DEVICE" filed on Jan. 31, 2014, the disclosure of which is incorporated herein by reference in its entirety.

BACKGROUND

With the growing availability of mobile devices, individuals may be increasingly exploring the expanding world of mobile applications, games, and social networks. For example, tablet computers may be used to engage children, with and without disabilities, in learning activities through an attractive and easy to use interface and design corresponding to such tablet computers.

Tablet computers may now be equipped with a variety of assets including intuitive user interfaces such as touchscreen, wireless connectivity via multiple different protocols such as Wi-Fi and Bluetooth, image capture capabilities, position sensing and/or location determination capabilities. A variety of applications have been introduced that capitalize on the widespread acceptance of tablet computers, which may, in part, be due to the general affordability. For example, some applications may be operable to offer assistance to individuals with speech difficulties by allowing them to create verbal words and/or phrases by pressing a series of images using a tablet device. Similarly some applications may be operable to combine an interactive drawing application with a robot or other device that may provide feedback based on a user's input sequence. Accessible messages may provide assistive text typing by highlighting keyboard elements as a user types by predicting the next sequence of letters or characters.

Unfortunately, such touch-based tools may be developed assuming that the user possesses fine motor skills and thus is capable of touching small specific regions with an appropriate level of intensity and timing. However, the assumption of fine motor skills may be unwarranted in the context of individuals having limited upper body motor control, including for example, in children with cerebral palsy (CP). For example, children with CP may sustain dysfunctions in upper extremity (UE) activities, such as reaching, grasping and manipulation. Current therapeutic interventions for UE control in children have emphasized repeated practice of functional activities in various contexts with sufficient feedback. However children with CP may have difficulty in accessing devices requiring fine motor control such as, for example, a common pinch and swipe gesture operations that may be used to interface with a tablet computer.

SUMMARY

According to one aspect of the present disclosure, a toy for providing input to a computing device is described. The toy includes a main body sized and shaped to fit within a grasp of a user of the toy. The toy also includes a plurality of input switches mounted to the main body. Each of the input switches can be configured to switch between at least a first position and a second position responsive to an action performed on the input switch. The toy also includes a removable outer covering that is configured to substantially encapsulate the main body. The outer covering can have a top surface and a bottom surface. The top surface includes a plurality of openings sized and shaped to receive a portion of each of the plurality of input switches. The toy also includes a programmable processing circuit enclosed within the main body. The processing circuit includes a plurality of input ports coupled to the plurality of input switches. The processing circuit also includes an output port coupled to a communications port to transmit output signals and programmable processing circuitry configured to operate in a plurality of operating modes. A first operating mode includes generating a first output signal responsive to receiving an input signal via a first input port coupled to a first input switch of the plurality of input switches and generating a second output signal responsive to receiving an input signal via a second input port coupled to a second input switch of the plurality of input switches. A second operating mode includes generating the first output signal responsive to receiving an input signal via the first input port coupled to the first input switch and generating the first output signal responsive to receiving an input signal via the second input port coupled to the second input switch. A third operating mode includes generating the first output signal responsive to receiving an input signal via the first input port coupled to the first input switch and generating the first output signal responsive to receiving an input signal via any of the remaining input ports coupled to a remaining portion of the plurality of input switches. The processing circuit also includes a wireless communications port configured to transmit the generated output signals to a communicatively coupled computing device.

In some implementations, at least one of the input switches is a push button. In some implementations, the toy includes a joystick mounted to the main body. In some implementations, at least one of the plurality of input switches includes a force sensor configured to sense an amount of force applied to the input switch. In some implementations, the programmable processing circuit includes a memory storing processor executable instructions and a processor, which is configured to execute the processor executable instructions. In some implementations, the processing circuit is configured to wirelessly receive programmable instructions to store in the memory.

In some implementations, the processing circuit receives an input signal responsive to an input switch of the plurality of input switches being actuated. In some implementations, the processing circuitry is configured to operate in the first operating mode responsive to programming the processing circuitry to operate in the first operating mode, operate in the second operating mode responsive to programming the processing circuitry to operate in the second operating mode, and operate in the third operating mode responsive to programming the processing circuitry to operate in the third operating mode.

According to another aspect, a method of manufacturing a toy capable of communicating with a computing device, includes providing a main body sized and shaped to fit within a grasp of a user of the toy. The method includes mounting a plurality of input switches to the main body. Each of the input switches is configured to switch between at least a first position and a second position responsive to an action performed on the input switch. The method includes substantially encapsulating a removable outer covering around the main body. The outer covering has a top surface and a bottom surface. The top surface includes a plurality of openings sized and shaped to receive a portion of each of the plurality of input switches. The method includes enclosing a programmable processing circuit within the main body. The processing circuit includes a plurality of input ports coupled to the plurality of input switches, an output port coupled to a communications port to transmit output signals and programmable processing circuitry capable of operating in a plurality of operating modes. A first operating mode includes generating a first output signal responsive to receiving an input signal via a first input port coupled to a first input switch of the plurality of input switches and generating a second output signal responsive to receiving an input signal via a second input port coupled to a second input switch of the plurality of input switches. A second operating mode includes generating the first output signal responsive to receiving an input signal via the first input port coupled to the first input switch and generating the first output signal responsive to receiving an input signal via the second input port coupled to the second input switch.

In some implementations, the method includes mounting a joystick to the main body. In some implementations, the removable outer covering includes a second opening sized and shaped to receive a portion of the joystick. In some implementations, the method includes mounting fasteners to the removable outer covering. The fasteners can be configured to fasten a portion of the top surface of the removable outer covering to a corresponding portion of the bottom surface of the removable outer covering.

According to yet another aspect, an apparatus for providing input to a computing device is described. The apparatus includes a main body sized and shaped to fit within a grasp of a user of the apparatus. The apparatus also includes a plurality of input switches mounted to the main body. Each of the input switches can be configured to switch between at least a first position and a second position responsive to an action performed on the input switch. The apparatus also includes a removable outer covering that is configured to substantially encapsulate the main body. The outer covering can have a top surface and a bottom surface. The top surface includes a plurality of openings sized and shaped to receive a portion of each of the plurality of input switches. The apparatus also includes a programmable processing circuit enclosed within the main body. The processing circuit includes a plurality of input ports coupled to the plurality of input switches. The processing circuit also includes an output port coupled to a communications port to transmit output signals and programmable processing circuitry configured to operate in a plurality of operating modes. A first operating mode includes generating a first output signal responsive to receiving an input signal via a first input port coupled to a first input switch of the plurality of input switches and generating a second output signal responsive to receiving an input signal via a second input port coupled to a second input switch of the plurality of input switches. A second operating mode includes generating the first output signal responsive to receiving an input signal via the first input port coupled to the first input switch and generating the first output signal responsive to receiving an input signal via the second input port coupled to the second input switch. A third operating mode includes generating the first output signal responsive to receiving an input signal via the first input port coupled to the first input switch and generating the first output signal responsive to receiving an input signal via any of the remaining input ports coupled to a remaining portion of the plurality of input switches. The processing circuit also includes a wireless communications port configured to transmit the generated output signals to a communicatively coupled computing device.

In some implementations, at least one of the input switches is a push button. In some implementations, the apparatus includes a joystick mounted to the main body. In some implementations, at least one of the plurality of input switches includes a force sensor configured to sense an amount of force applied to the input switch. In some implementations, the programmable processing circuit includes a memory storing processor executable instructions and a processor, which is configured to execute the processor executable instructions. In some implementations, the processing circuit is configured to wirelessly receive programmable instructions to store in the memory.

In some implementations, the processing circuit receives an input signal responsive to an input switch of the plurality of input switches being actuated. In some implementations, the processing circuitry is configured to operate in the first operating mode responsive to programming the processing circuitry to operate in the first operating mode, operate in the second operating mode responsive to programming the processing circuitry to operate in the second operating mode, and operate in the third operating mode responsive to programming the processing circuitry to operate in the third operating mode.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying drawings, which are incorporated in and constitute a part of the specification, illustrate embodiments of the invention and, together with the description, serve to explain principles of the invention.

FIGS. 4A-4N are perspective views of various toy configurations according to some embodiments of the present invention.

FIGS. 5A-5E are top views of five various toy configurations according to some embodiments of the present invention.

DETAILED DESCRIPTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

As described above, individuals with motor impairments often struggle to use various applications that rely on the use of a touch screen interface to receive user input. The present disclosure is directed towards a toy or apparatus through which users can interact with applications. The toy or apparatus can be a wireless controller for individuals with motor impairments, which is designed to provide such individuals access to the world through tablet interaction. The wireless controller enables wireless access to a computing device, such as a laptop, tablet, phone or other computing device. The wireless controller can include a plurality of input switches. The wireless controller can also include an embedded software driver that can be configured to translate input signals generated from an individual's interaction with the input switches into touch-screen based gestures. This provides the ability to generate a number of unique commands or output signals using the wireless device, which enables automated conversion of inputs into gestures. Once the output signals are generated, the output signals are transmitted wirelessly to the computing device with which the wireless controller is communicating. In some implementations, the wireless controller may be configured to communicate with the computing device using WiFi, Bluetooth, or other short, medium or long range connection types. In some implementations, the wireless controller may be substantially enclosed in a plush stationary housing having a child-friendly design designed to increase durability and interactivity for children, In some implementations, the wireless controller can include a joystick.

Figure 1:
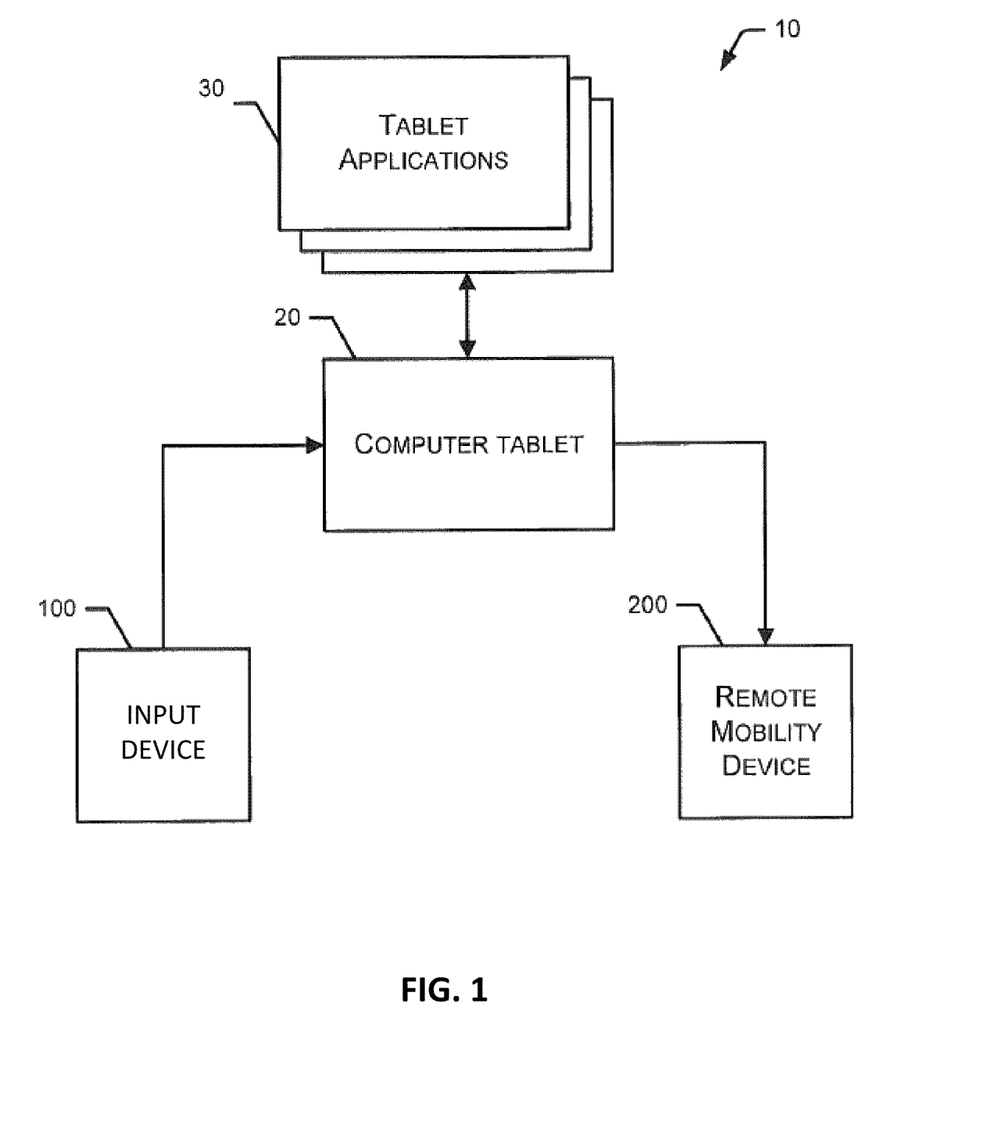
FIG. 1 is a block diagram illustrating a system for providing accessibility to an electronic device according to some embodiments of the present invention.

Reference is now made to FIG. 1, which is a block diagram illustrating a system for providing accessibility to an electronic device according to some embodiments of the present invention. In some embodiments, a system 10 as disclosed herein may provide accessibility to an electronic device, such as, for example a computer tablet 20 for individuals having reduced fine motor functionality. A system 10 may include an apparatus 100 that may receive a physical input from a user and that may generate a gesture input signal that may be received by the computer tablet 20 for controlling tablet applications 30 that are configured to execute thereon. Although examples discussed herein may include a computer tablet 20, any electronic device including a processor may be used herein. For example, an electronic device may include a desktop and/or stationary computer, or a mobile terminal, a computing/processing device such as a wireless phone, a personal digital assistant, a smart phone, a tablet computing device, and/or other portable computing device.

In some embodiments, the input device 100 may be a wireless interface that is configured to transmit gesture input signals to the computer tablet 20 via one or more wireless communication protocols. For example, the input device may transmit data using operations in any of the following radio access technologies: Bluetooth, Bluetooth 4.0, GSM, code division multiple access (CDMA), wideband-CDMA, CDMA2000, Universal Mobile Telecommunications System (UMTS), Third Generation Partnership Project (3GPP) Long Term Evolution (LTE), Wi-Fi, and/or WiMAX, among others. In some embodiments, the input device 100 may be configured to transmit gesture input signal data to the computer tablet 20 using one or more different wired data communication paths exclusively and/or in combination with one or more of the wireless communication protocols.

The input device 100 may provide access and control of the computer tablet 20, including multiple different tablet applications 30 that are configured to run on the computer tablet 20. Tablet applications 30 may include computer readable code that is configured to generate a graphical user interface in the computer tablet 20. Some embodiments provide that the graphical user interface may visually correspond to an arrangement of user input devices in the input device. Tablet applications 30 may further include computer readable code that is configured to interpret received gesture input signals to control the computer tablet 20 via the graphical input device.

Figure 2A:
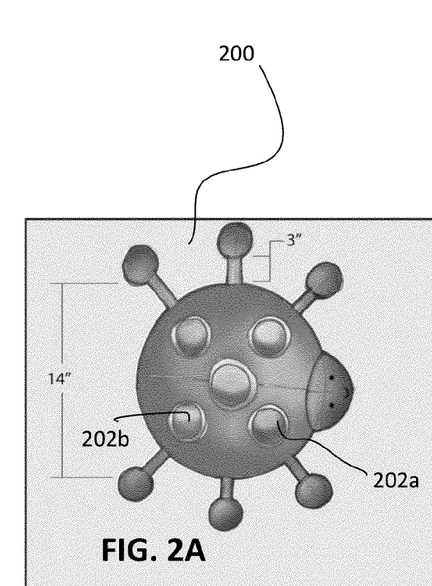
FIGS. 2A-2C are front, side and perspective views of a toy controller according to some embodiments of the present invention.
Figure 2B:
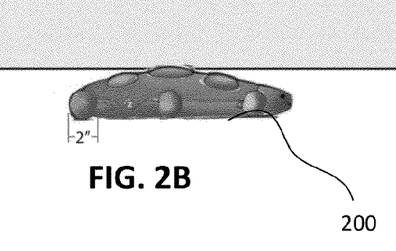
Figure 2C:
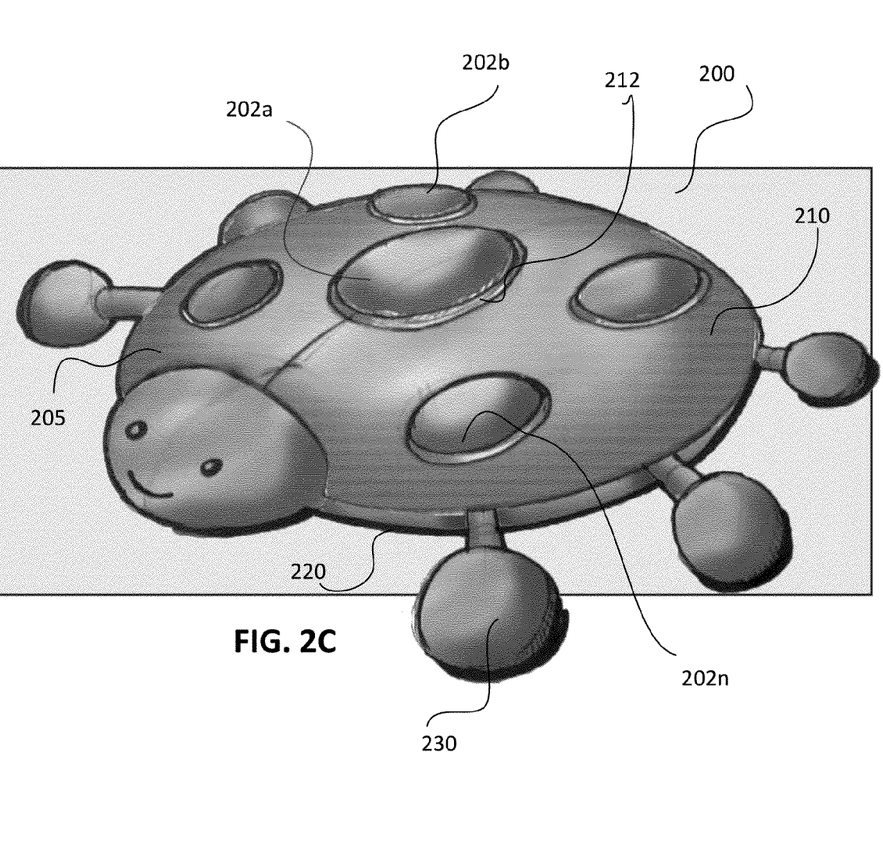

Reference is now made to FIGS. 2A-2C, front, side and perspective views of a toy controller are shown. The toy controller 200 can be designed, constructed or configured to communicate with a computing device. The toy controller 200 can serve as an input device to the computing device. The toy controller 200 can include a main body (not shown) that includes a processing circuit (not shown) and one or more input switches 202a-202n. The main body can be sized and shaped to fit within a grasp of a user of the toy controller 200. In some implementations, the input switches 202 are mounted to the main body. In some implementations, the input switches 202 are operatively coupled to the main body. In some implementations, the input switches 202 are push button switches that operate in two states. In some implementations, the input switches 202 are biased towards a first state. In some implementations, one or more of the input switches can include an input component for controlling a direction of a cursor displayed on a display of the computing device. In some implementations, one or more of the input switches can include a joystick. In some implementations, one or more of the input switches can include a trackball or track pad.

In some implementations, the main body of the toy controller 200 can be substantially enclosed by a removable outer covering 205. The removable outer covering 205 can be designed and constructed to serve as a toy for children. For example, the removable outer covering 205 can be designed to look like a stuffed animal or toy. The removable outer covering 205 can include a top surface 210 and a bottom surface 220 that may be partially or substantially joined together along the edges. In some implementations, the outer covering can be made from a plush or soft fabric. In some implementations, the fabric used to make the outer covering can be washable.

In some implementations, the top surface 210 of the removable outer covering 220 can include one or more openings 212. The openings 212 can be sized and shaped to receive a portion of one or more input switches 202. In some implementations, at least one opening 212 can be sized such that once a portion of the corresponding input switch 202 is received through the opening 212, there is no gap or there is a small gap between an edge of the opening 212 and an outer surface of the input switch 202. In some implementations, the openings 212 can be covered by a covering material (not shown) such that the material is connected to the edge of the openings 212. In some implementations, the input switches 202 may be configured such that they do not pass through the openings 212 but rather, may be positioned beneath the covering material.

Figures 3A, 3B:
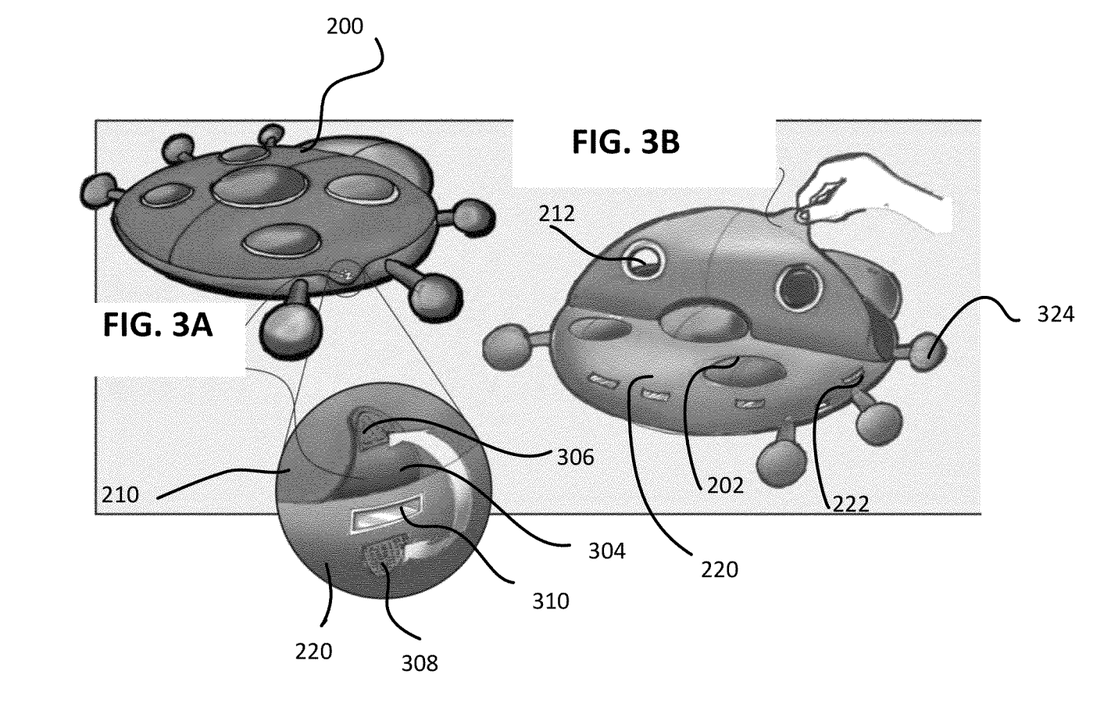
FIG. 3A shows an enlarged view of a portion of the toy controller as illustrated in FIG. 2.
FIG. 3B shows a perspective view of the toy controller as illustrated in FIG. 2.

FIG. 3A shows an enlarged view of a portion of the toy controller illustrated in FIG. 2. The top surface 210 of the outer covering 202 includes a flap portion 304 configured to conceal a port 310. The port 310 can be a USB port, HDMI port, or other communication port through which data can be transferred to the processing circuit of the toy controller 200. The flap portion 304 can include a fastener 306 configured to engage with a corresponding fastener 308 positioned on the bottom surface 220 of the outer covering 202. The fasteners 306 and 308 can be a button and button hole pair, a snap button and button socket, a hook and loop fastener, amongst others. In some implementations, the flap portion 304 of the top surface 210 can be configured to be inserted into a slit formed in the bottom surface such that when the flap portion is inserted in the slit, the port 310 is concealed by the flap portion 304.

FIG. 3B shows a perspective view of the toy controller as illustrated in FIG. 2. As shown in FIG. 3B, the top surface 210 of the outer covering 202 includes the plurality of openings 212. In some implementations, the top surface 210 may include fastening components (not shown) configured to engage with counterpart fastening components 222 of the bottom surface 220 of the removable outer covering 205. In some implementations, the fastening components can be buttons and corresponding buttonholes. In some implementations, the fastening components can be hook and loop fasteners, such as VELCRO. In some implementations, the fastening components can together form a zipper. In some implementations, the fastening components can be any type of fastener that can fasten the top surface of the outer covering to the bottom surface of the outer covering. In this way, once the removable outer covering encapsulates the main body of the toy controller 200, the top surface 210 and the bottom surface 220 of the removable outer covering 205 can be fastened to prevent the main body of the toy controller from slipping out of the outer covering 205.

In some implementations, the toy controller can include one or more holding members 324. The holding members can be shaped and sized to fit within the grasp of a user. In this way, a user can carry the toy controller by grasping one or more of the holding members 324. The holding members 324 can be designed such that they appear to be a part of the toy. For example, if the toy is a ladybug, the holding members can be shaped and sized to appear as the legs of the ladybug. In another example, if the toy is a monkey, the holding members can be shaped and sized to appear as the tail, arms or legs of the monkey.

Referring now generally to the apparatus 200 shown in FIGS. 2A-2C and 3A-3C, the main body of the apparatus includes a programmable processing circuit. The programmable processing circuit includes a microcontroller having a programmable memory. In some implementations, the microcontroller can be an 8-bit microcontroller. An example microcontroller includes the AT43USB326 microcontroller made by ATMEL Inc., headquartered in San Jose, Calif., USA. In some implementations, the microcontroller can include 32 pins or ports, some of which are operatively coupled to the input switches 202. In this way, when a user takes an action on an input switch 202, an input signal from the input switch 202 is generated and provided as an input signal to the microcontroller via an input port or pin of the microcontroller to which the input switch is operatively coupled. The microcontroller can be configured to generate output signals based on the input signal received at the microcontroller, the pin at which the input signal was received and the programming instructions stored in the programmable memory of the microcontroller. The output signals generated by the microcontroller can be output at one or more output pins of the microcontroller.

In some implementations, the output pins can be operatively coupled to a wireless transceiver. Examples of wireless transceivers can include a Bluetooth transceiver, a WiFi transceiver or other communications transceiver.

In some implementations, the programmable processing circuit can further include a communications port for programming the microcontroller. The communications port can be a USB port, an HDMI port, or any other type of port through which data can be transferred to the microcontroller.

In some implementations, the programmable processing circuit can also include a power storage device, such as a battery. The battery can be configured to store electrical energy, which can be supplied to each of the USB port, the microcontroller and the wireless transceiver. In some implementations, the power storage device can include a port through which the power storage device can be charged. In some implementations, the power storage device can be configured to supply power to other components of the processing circuit, including to audio, visual or haptic components mounted to the processing circuitry. The audio, visual or haptic components can be configured to generate a response to alert the user of certain conditions or events. For example, a haptic response can be generated to indicate that the correct input switch was correctly pressed. As another example, an audio or response can be generated to indicate a low battery.

In some implementations, the processing circuit can be configured to operate in a plurality of different operating modes. In some implementations, the processing circuit may include a switch that allows for the processing circuit to operate in a first operating mode when the switch is in a first state and to operate in a second operating mode when the switch is in a second state, and so forth. The number of operating modes the processing circuit can operate in without having to reprogram the processing circuit can be based on the size of the memory of the processing circuit. In some implementations, the processing circuit can be configured to operate in a single operating mode that corresponds to the instructions stored in the programmable memory of the processing circuit. In some such implementations, to configure the processing circuit to operate in a different operating mode, the memory of the processing circuit can be programmed with different set of instructions. To program the memory of the processing circuit, instructions corresponding to an operating mode can be transmitted to and stored on the memory of the processing circuit. In some implementations, the instructions can be computer-readable instructions that can be executed by the processor. The instructions can cause the processor to output a specific output signal at a particular output pin of the microcontroller in response to receiving an input signal at a particular input pin of the microcontroller.

In some implementations, when the processing circuit is operating in the first operating mode, the processing circuit is configured to generate a first output signal responsive to receiving an input signal via a first input port or pin of the microcontroller that is coupled to a first input switch. The processing circuit is configured to generate a second output signal responsive to receiving an input signal via a second input port coupled to a second input switch of the plurality of input switches. In this operating mode, two different output signals are generated when two different input switches are actuated.

In some implementations, when the processing circuit is operating in the second operating mode, the processing circuit is configured to generate the first output signal responsive to receiving an input signal via the first input port coupled to the first input switch and configured to generate the same first output signal responsive to receiving an input signal via the second input port coupled to the second input switch. In this operating mode, the same output signal is generated when any one of two different input switches is actuated. In this operating mode, two different output signals are generated when two different input switches are actuated.

In some implementations, when the processing circuit is operating in the third operating mode, the processing circuit is configured to generate the first output signal responsive to receiving an input signal via the first input port coupled to the first input switch and generate the first output signal responsive to receiving an input signal via any of the remaining input ports coupled to a remaining portion of the plurality of input switches. In this operating mode, the same output signal is generated when any of the input switches is actuated. That is, from the perspective of a computing device receiving the output signal from the toy controller 200, the computing device can determine that an input switch has been actuated but is unable to determine which of the plurality of input switches was actuated to generate the output signal. This is because the output signal does not identify the input switch that was actuated to generate the output signal.

Figure 4A:
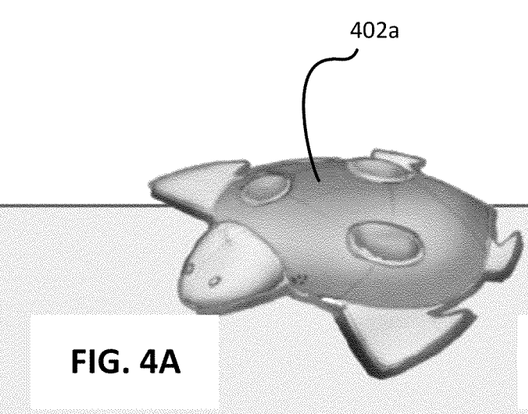
Figure 4B:
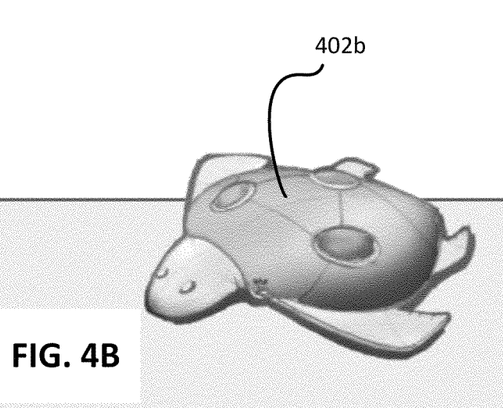
Figure 4C:
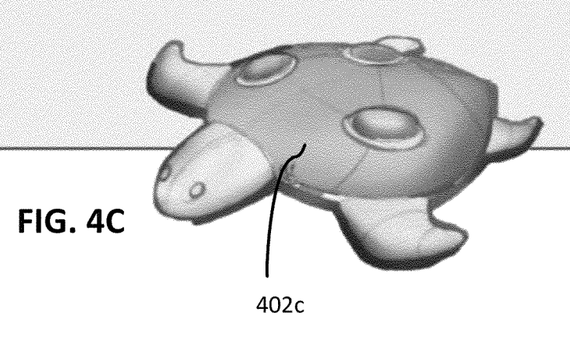
Figure 4D:
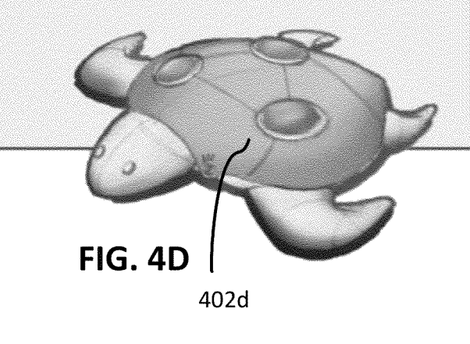
Figure 4E:
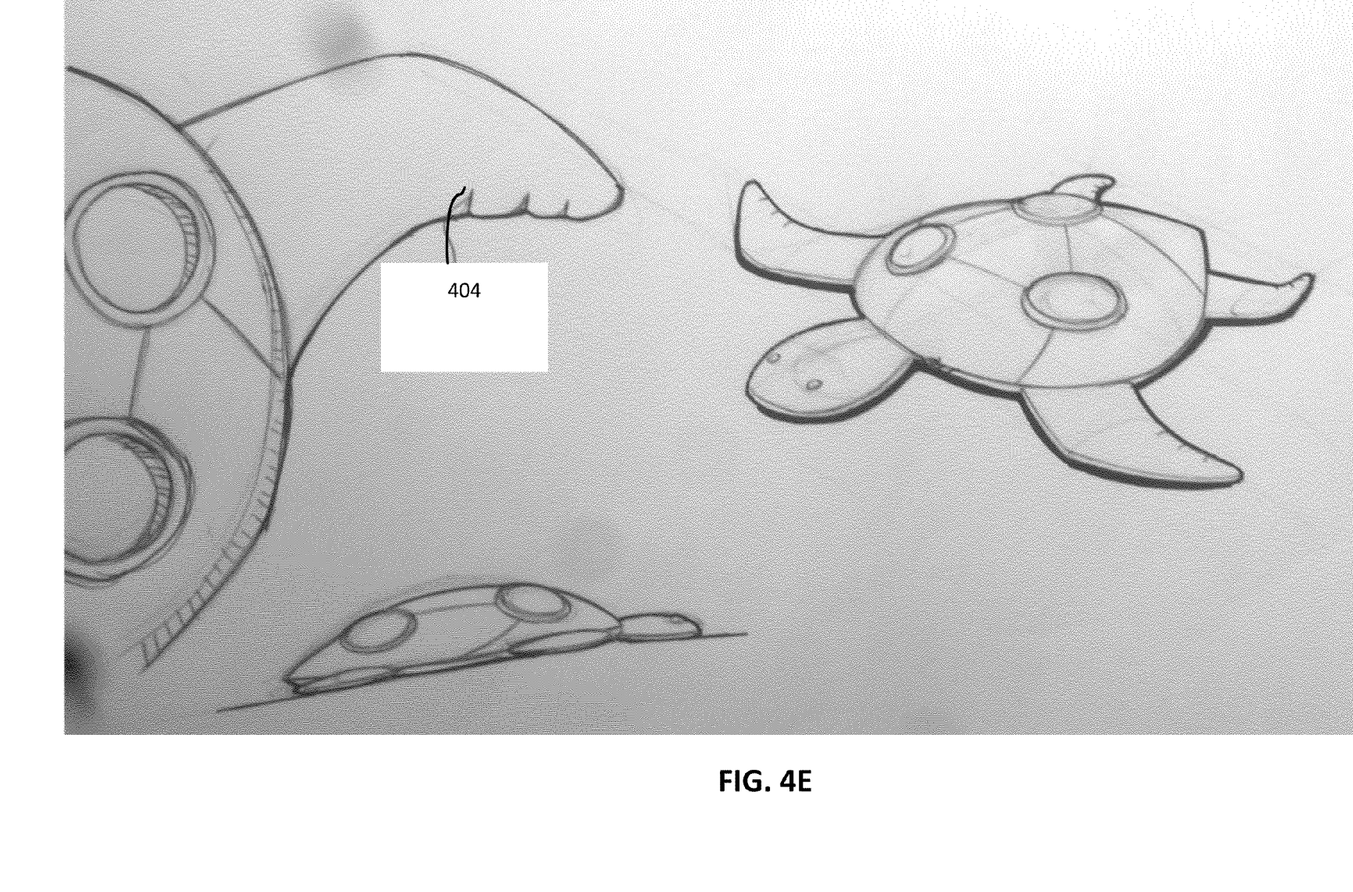
Figure 4F:
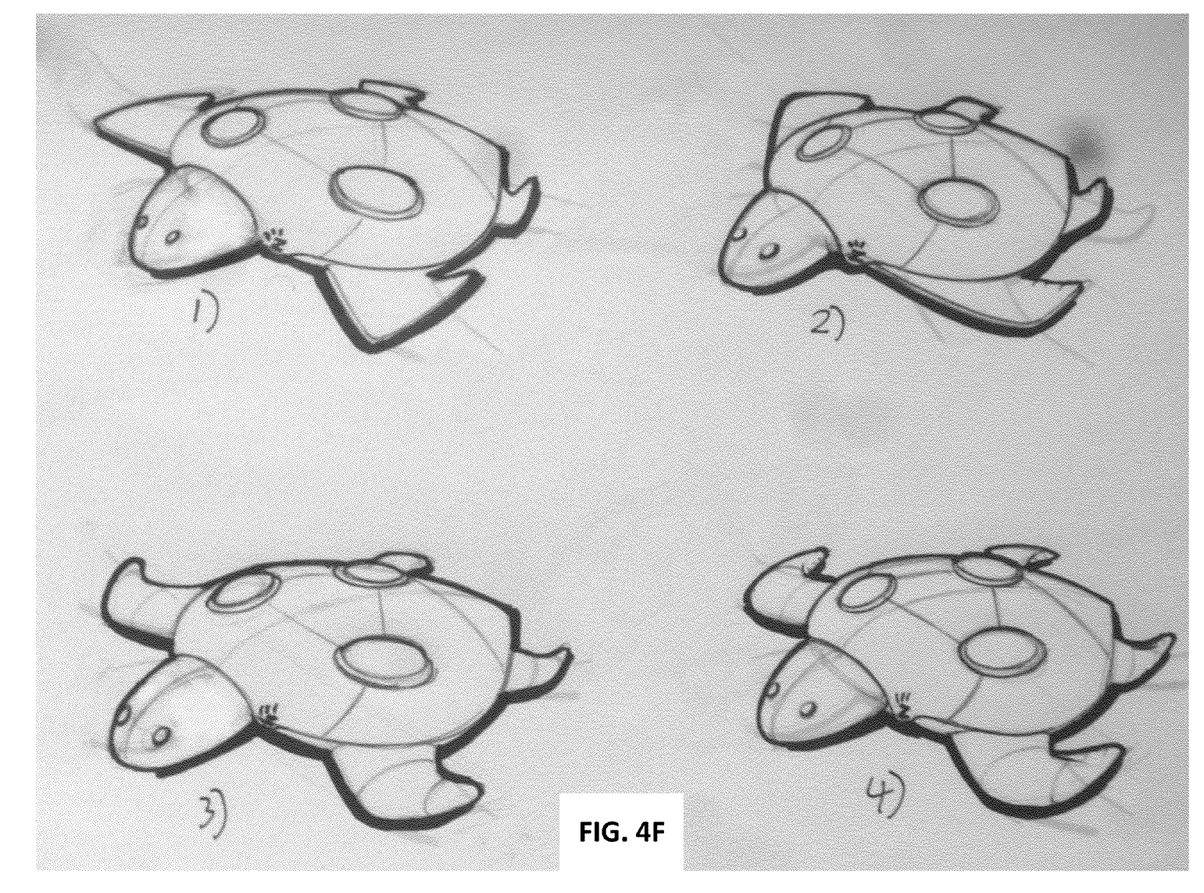
Figure 4G:
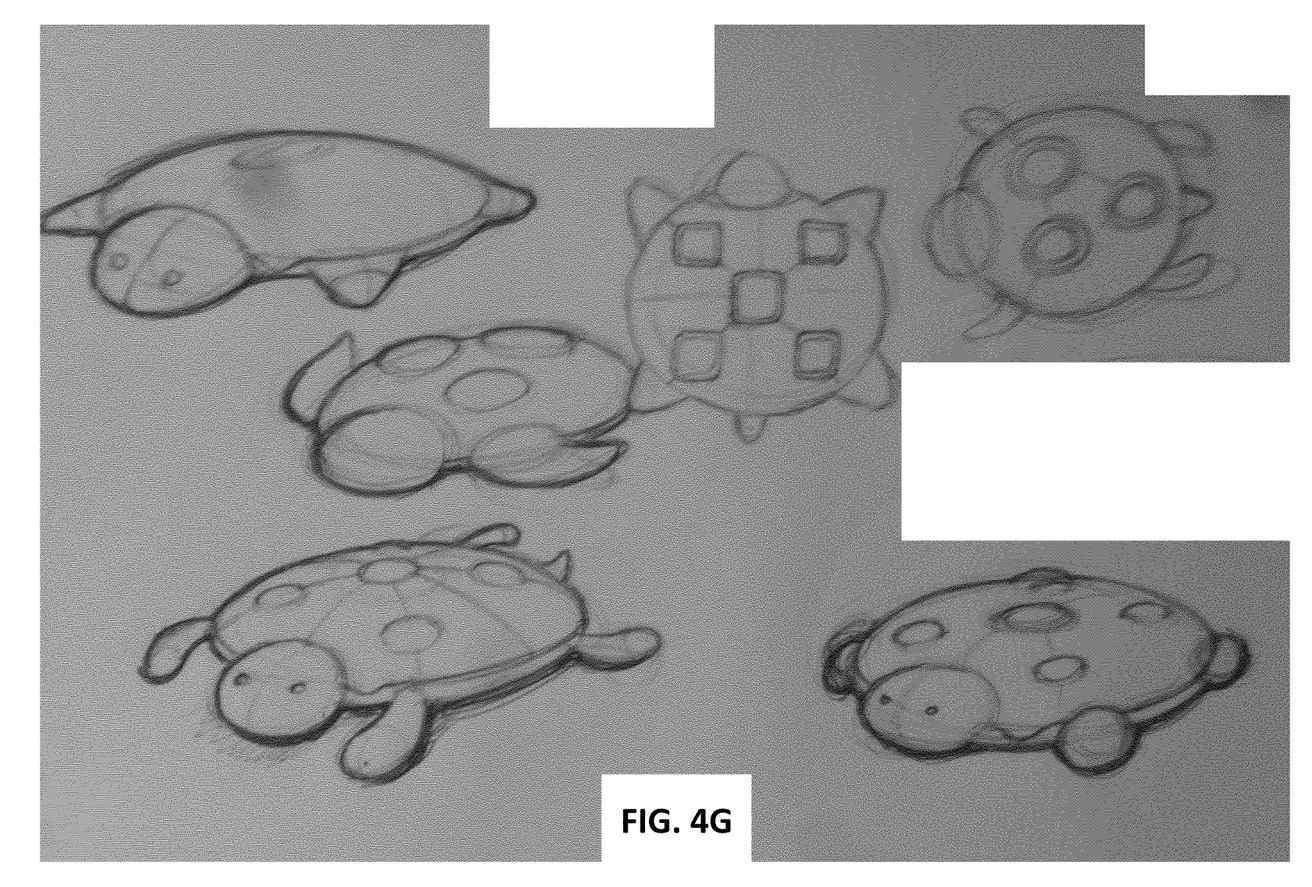

Referring now to FIGS. 4A-4Q, various views of various toy configurations are shown. As shown in FIGS. 4A-4Q, the toy is a toy turtle. Each of the turtles 402a-402d shown in FIGS. 4A-4D can have the same input device configuration but different leg and head shapes and sizes. The toy configurations shown in FIGS. 4A-4Q display ornamental design features for the toy. As shown in FIGS. 4E-4G, the toy configurations can include one or more stitches 404 that can be used to add details to the toy. In some implementations, a logo of a company can be placed on the outer surface of the toy.

Figure 5A:
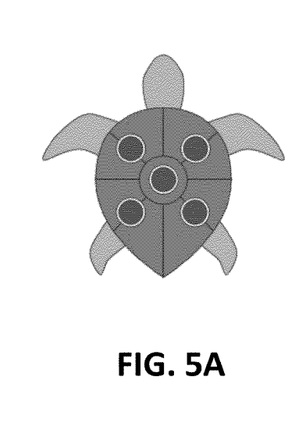
Figure 5B:
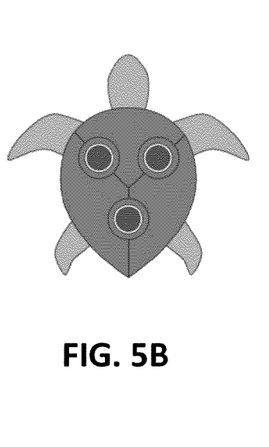
Figure 5C:
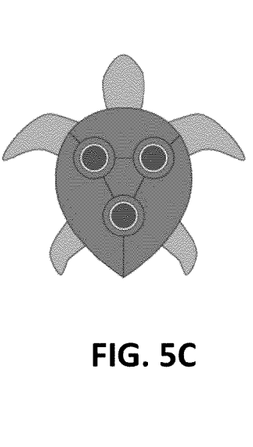
Figure 5D:
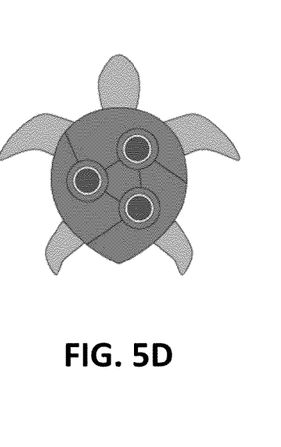
Figure 5E:
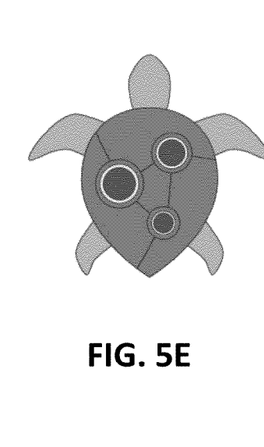

Referring now to FIGS. 5A-5E, perspective views of four various toy configurations are shown top views of five various toy configurations are shown. As shown in FIGS. 5A-5E, the toy is a toy turtle. Each of the turtles 502a-502e shown in FIGS. 5A-5E can have the same outline but different input device configurations. As shown in FIG. 5A, there are five equally sized and shaped input devices. In FIG. 5B, three input devices are equally sized and shaped and are arranged at the end points of a Y formation. In FIG. 5C, three input devices are equally sized and shaped and are arranged at the corners of an equilateral triangle. In FIG. 5D, the three input devices are also arranged at the corners of an equilateral triangle but are oriented relative to a head of the turtle in a manner that is different than the orientation of the input devices shown in FIG. 5C. In FIG. 5E, the three input devices are again arranged at the corners of an equilateral triangle but each of the input devices are sized differently. It should be appreciated that other input device configurations are possible and lie within the scope of the present disclosure. In particular, the toy can have any number of input devices, of any shape and size, and can be arranged anywhere on the turtle. In some implementations, the legs and head of the turtle can also be utilized as real estate for placing input devices. The toy configurations shown in FIGS. 5A-5E display ornamental design features for the removable outer covering configured to substantially encapsulate the main body.

It should be understood that the toy configurations shown in FIGS. 2A-5E include both functional features as well as ornamental features. The functional features of the toy may include features that contribute to the toy controller's ability to provide input to a computing device. The ornamental features of the toy shown in FIGS. 2A-5E can include ornamental features that do not affect the toy controller's ability to provide input to a computing device. Examples of the ornamental features can include the shape, size and configuration of various parts of the toy, including the buttons, as well as other body portions of the toy. Moreover, it should be understood that some of the ornamental features of the toy are optional and various embodiments of the toy configurations shown in FIGS. 2A-5E may include only some of the ornamental features shown in the toy configurations shown in FIGS. 2A-5E.

Figure 6:
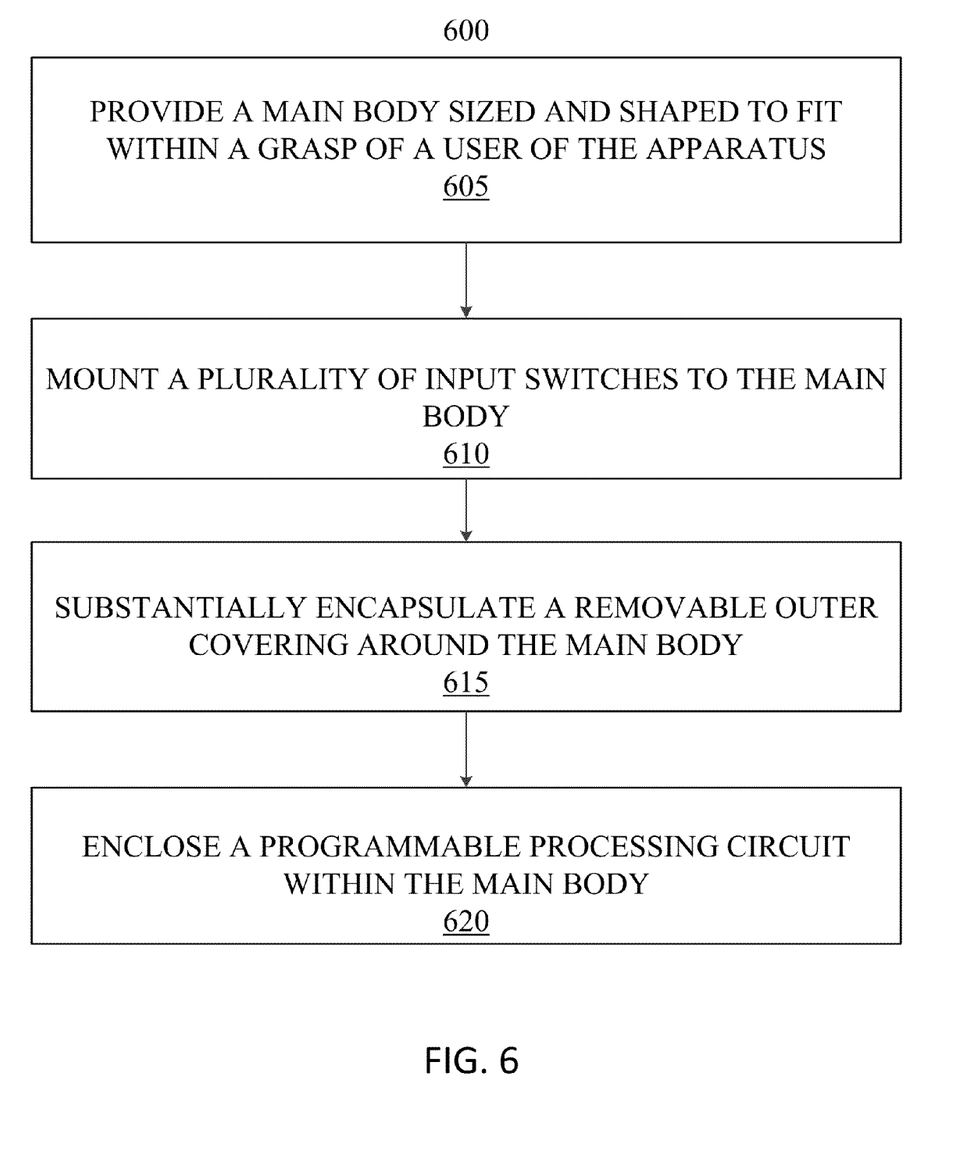
FIG. 6 is a flow diagram illustrating operations corresponding to manufacturing an apparatus capable of communicating with a computing device according to some embodiments of the present invention.

Reference is now made to FIG. 6 is a flow diagram illustrating operations corresponding to manufacturing an apparatus capable of communicating with a computing device according to some embodiments of the present invention. In brief overview, a main body sized and shaped to fit within a grasp of a user of the apparatus is provided (block 605). A plurality of input switches is mounted to the main body (block 610). A removable outer covering is substantially encapsulated around the main body (block 615). A programmable processing circuit is enclosed within the main body (block 620).

In further detail, a main body sized and shaped to fit within a grasp of a user of the apparatus is provided (block 605). The main body can include one or more mounting locations to which one or more input switches can be mounted. The main body can be configured to enclose a processing circuit. A plurality of input switches is mounted to the main body (block 610). The input switches can be mounted to the main body. The input switches can be operatively coupled to the main body. Each of the input switches can be configured to switch between at least a first position and a second position responsive to an action performed on the input switch. In some implementations, a user can press the input switch to switch the input switch between the first position and the second position. In some implementations, the method can include mounting a joystick to the main body. In some implementations, the method can include A removable outer covering is substantially encapsulated around the main body (block 615). The outer covering can have a top surface and a bottom surface. In some implementations, the top surface includes a plurality of openings sized and shaped to receive a portion of each of the plurality of input switches. In some implementations, the method also includes mounting fasteners to the removable outer covering. The fasteners configured to fasten a portion of the top surface of the removable outer covering to a corresponding portion of the bottom surface of the removable outer covering. Examples of fasteners can include zip components, buttons and button holes, hook and loop fasteners, snap on buttons amongst others.

The method further includes enclosing a programmable processing circuit within the main body (block 620). The programmable processing circuit includes a plurality of input ports coupled to the plurality of input switches and an output port coupled to a communications port to transmit output signals. The processing circuit also includes a programmable processing circuitry capable of operating in a plurality of operating modes. The processing circuitry can operate in a first operating mode, in which the processing circuitry is configured to generate a first output signal responsive to receiving an input signal via a first input port coupled to a first input switch of the plurality of input switches and to generate a second output signal responsive to receiving an input signal via a second input port coupled to a second input switch of the plurality of input switches. The processing circuitry can operate in a second operating mode, in which the processing circuitry is configured to generate the first output signal responsive to receiving an input signal via the first input port coupled to the first input switch and generating the first output signal responsive to receiving an input signal via the second input port coupled to the second input switch. The processing circuit can be configured to transmit the output signals to the computing device with which the apparatus is configured to communicate. An output signal can have a unique characteristic identifying an input switch that was actuated to cause the processing circuit to generate the output signal. In this way, when the output signal is received by the computing device, the computing device can identify the input switch of the apparatus that caused the output signal to be generated.

Figure 7A:
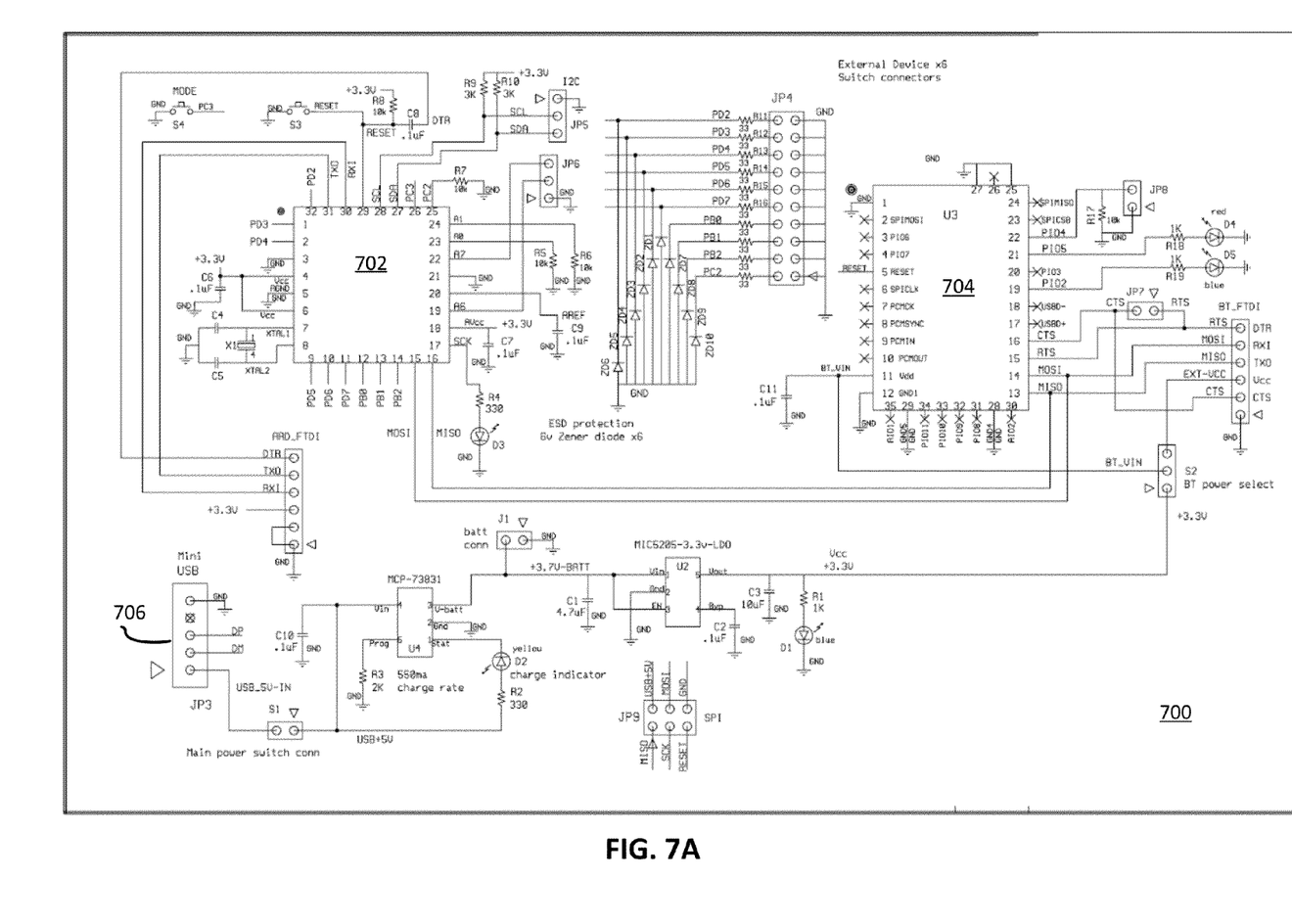
FIGS. 7A and 7B are top views of various embodiments of a programming circuit associated with the toy controller shown in FIGS. 2A-2C according to some embodiments of the present invention.
Figure 7B:
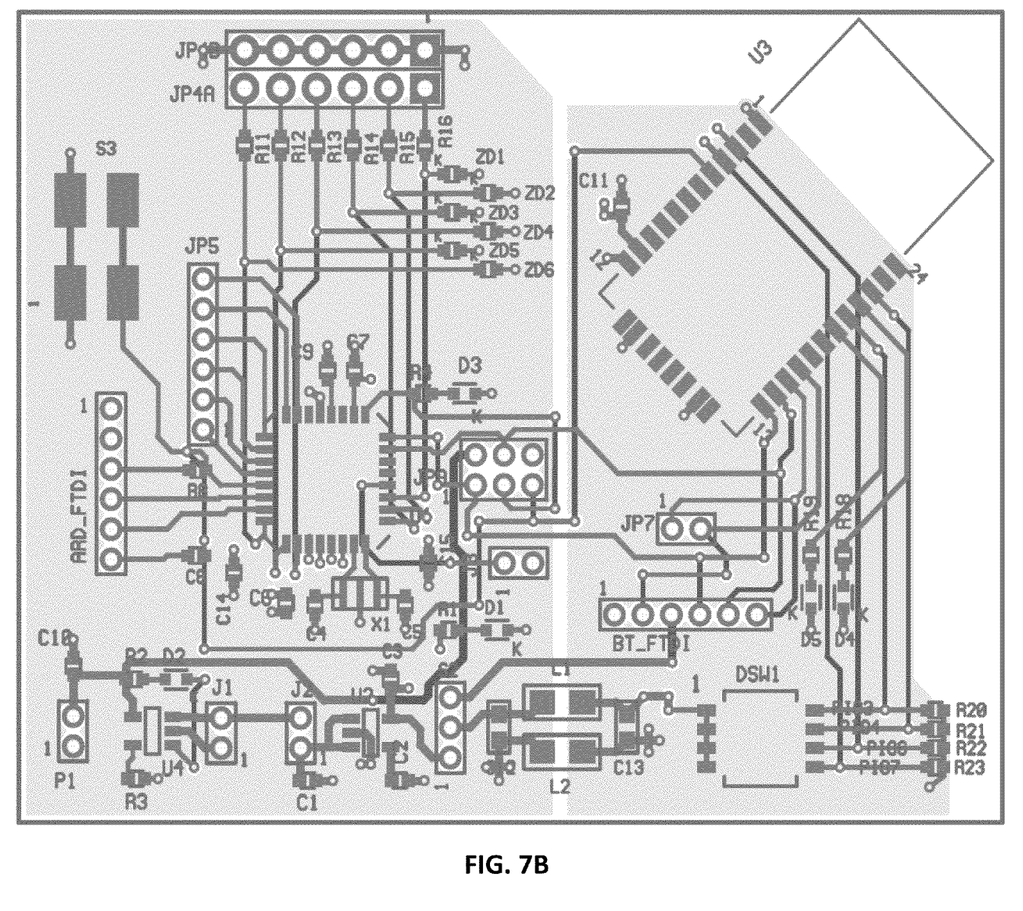

FIGS. 7A and 7B are top views of various embodiments of a programming circuit associated with the toy controller shown in FIGS. 2A-2C according to some embodiments of the present invention. As shown in FIG. 7A, a processing circuit 700 includes a microcontroller 702 that is configured to receive input signals from each of a plurality of switches coupled to buttons configured to receive user input. The microcontroller 702 is further configured to process the received input signals according to stored memory instructions that are stored on the microcontroller and generate output signals that are configured to be transmitted to a wireless transceiver 704. The wireless transceiver 704, such as a Bluetooth transmitter can transmit the output signals to a remote computing device, which can be configured to identify the received user input. In some implementations, the microcontroller can be an 8-bit microcontroller. An example microcontroller includes the AT43USB326 microcontroller made by ATMEL Inc., headquartered in San Jose, Calif., USA. In some implementations, the microcontroller can include 32 pins or ports, some of which are operatively coupled to the input switches, such as the input switches 202 shown in FIGS. 2A-2C. Examples of the wireless transceiver 704 can include a Bluetooth transceiver, a WiFi transceiver or other communications transceiver. In some implementations, the programmable processing circuit 700 can further include a communications port 706 for programming the microcontroller 702. The communications port 706 can be a USB port, an HDMI port, or any other type of port through which data can be transferred to the microcontroller.

In some implementations, the programmable processing circuit can also include a power storage device, such as a battery. The battery can be configured to store electrical energy, which can be supplied to each of the USB port 706, the microcontroller 702 and the wireless transceiver 704. In some implementations, the power storage device can include a port through which the power storage device can be charged. In some implementations, the power storage device can be configured to supply power to other components of the processing circuit, including to audio, visual or haptic components mounted to the processing circuitry. The audio, visual or haptic components can be configured to generate a response to alert the user of certain conditions or events. For example, a haptic response can be generated to indicate that the correct input switch was correctly pressed. As another example, an audio or response can be generated to indicate a low battery.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

The invention claimed is:

1. A toy for providing input to a computing device, comprising:
 a main body sized and shaped to fit within a grasp of a user of the toy;
 a plurality of input switches mounted to the main body, each of the input switches configured to switch between at least a first position and a second position responsive to an action performed on the input switch;
 a removable outer covering configured to substantially encapsulate the main body, the outer covering having a top surface and a bottom surface, the top surface comprising a plurality of openings sized and shaped to receive a portion of each of the plurality of input switches;
 a programmable processing circuit enclosed within the main body, the processing circuit including
 a plurality of input ports coupled to the plurality of input switches;
 an output port coupled to a communications port to transmit output signals; and
 programmable processing circuitry configured to operate in a plurality of operating modes, wherein
  a first operating mode includes generating a first output signal responsive to receiving an input signal via a first input port coupled to a first input switch of the plurality of input switches and generating a second output signal responsive to receiving an input signal via a second input port coupled to a second input switch of the plurality of input switches;
  a second operating mode includes generating the first output signal responsive to receiving an input signal via the first input port coupled to the first input switch and generating the first output signal responsive to receiving an input signal via the second input port coupled to the second input switch; and
  a third operating mode includes generating the first output signal responsive to receiving an input signal via the first input port coupled to the first input switch and generating the first output signal responsive to receiving an input signal via any of the remaining input ports coupled to a remaining portion of the plurality of input switches; and
 a wireless communications port configured to transmit the generated output signals to a communicatively coupled computing device.

2. The toy of claim 1, wherein at least one of the input switches is a push button.

3. The toy of claim 1, further comprising a joystick mounted to the main body.

4. The toy of claim 1, wherein the programmable processing circuit includes a memory storing processor executable instructions and a processor, which is configured to execute the processor executable instructions.

5. The toy of claim 1, wherein the processing circuit is configured to wirelessly receive programmable instructions to store in the memory.

6. The toy of claim 1, wherein the processing circuit receives an input signal responsive to an input switch of the plurality of input switches being actuated.

7. The toy of claim 1, wherein the processing circuitry is configured to:
operate in the first operating mode responsive to programming the processing circuitry to operate in the first operating mode;
operate in the second operating mode responsive to programming the processing circuitry to operate in the second operating mode; and
operate in the third operating mode responsive to programming the processing circuitry to operate in the third operating mode.

8. The toy of claim 1, wherein at least one of the plurality of input switches includes a force sensor configured to sense an amount of force applied to the input switch.

9. An apparatus for providing input to a computing device, comprising:
a main body sized and shaped to fit within a grasp of a user of the apparatus;
a plurality of input switches mounted to the main body, each of the input switches configured to switch between at least a first position and a second position responsive to an action performed on the input switch;
a removable outer covering configured to substantially encapsulate the main body, the outer covering having a top surface and a bottom surface, the top surface comprising a plurality of openings sized and shaped to receive a portion of each of the plurality of input switches;
a programmable processing circuit enclosed within the main body, the processing circuit including
a plurality of input ports coupled to the plurality of input switches;
an output port coupled to a communications port to transmit output signals; and
programmable processing circuitry configured to operate in a plurality of operating modes, wherein
a first operating mode includes generating a first output signal responsive to receiving an input signal via a first input port coupled to a first input switch of the plurality of input switches and generating a second output signal responsive to receiving an input signal via a second input port coupled to a second input switch of the plurality of input switches;
a second operating mode includes generating the first output signal responsive to receiving an input signal via the first input port coupled to the first input switch and generating the first output signal responsive to receiving an input signal via the second input port coupled to the second input switch; and
a third operating mode includes generating the first output signal responsive to receiving an input signal via the first input port coupled to the first input switch and generating the first output signal responsive to receiving an input signal via any of the remaining input ports coupled to a remaining portion of the plurality of input switches; and
a wireless communications port configured to transmit the generated output signals to a communicatively coupled computing device.

10. The apparatus of claim 1, wherein at least one of the input switches is a push button.

11. The apparatus of claim 1, further comprising a joystick mounted to the main body.

12. The apparatus of claim 1, wherein the programmable processing circuit includes a memory storing processor executable instructions and a processor, which is configured to execute the processor executable instructions.

13. The apparatus of claim 1, wherein the processing circuit is configured to wirelessly receive programmable instructions to store in the memory.

14. The apparatus of claim 1, wherein the processing circuit receives an input signal responsive to an input switch of the plurality of input switches being actuated.

15. The apparatus of claim 1, wherein the processing circuitry is configured to:
operate in the first operating mode responsive to programming the processing circuitry to operate in the first operating mode;
operate in the second operating mode responsive to programming the processing circuitry to operate in the second operating mode; and
operate in the third operating mode responsive to programming the processing circuitry to operate in the third operating mode.

16. The apparatus of claim 1, wherein at least one of the plurality of input switches includes a force sensor configured to sense an amount of force applied to the input switch.

* * * * *